United States Patent
Whitehead et al.

(10) Patent No.: US 11,391,372 B2
(45) Date of Patent: Jul. 19, 2022

(54) EXTRUDED INTERLOCKING JIGSAW SEAL WITH SEALING BEADS

(71) Applicant: Parker-Hannifin Corporation, Cleveland, OH (US)

(72) Inventors: Edward B. Whitehead, Dearborn, MI (US); Timothy D. Heiman, Warsaw, IN (US)

(73) Assignee: Parker-Hannifin Corporation, Cleveland, OH (US)

( * ) Notice: Subject to any disclaimer, the term of this patent is extended or adjusted under 35 U.S.C. 154(b) by 154 days.

(21) Appl. No.: 16/835,726

(22) Filed: Mar. 31, 2020

(65) Prior Publication Data
US 2020/0340583 A1    Oct. 29, 2020

Related U.S. Application Data

(60) Provisional application No. 62/837,458, filed on Apr. 23, 2019.

(51) Int. Cl.
*F16J 15/06* (2006.01)
*F16J 15/02* (2006.01)

(52) U.S. Cl.
CPC ........... *F16J 15/062* (2013.01); *F16J 15/022* (2013.01)

(58) Field of Classification Search
CPC .... F16J 15/00; F16J 15/02; F16J 15/46; F16J 15/48; F16J 15/06; F16J 15/062; F16J 15/021; F16J 15/022; F16J 15/024; F16J 15/025; F16J 15/027
USPC ........................................................ 277/641
See application file for complete search history.

(56) References Cited

U.S. PATENT DOCUMENTS

| | | | |
|---|---|---|---|
| 3,048,415 A | 8/1962 | Shook | |
| 3,124,502 A * | 3/1964 | RadKe | F16J 15/20 428/66.4 |
| 3,166,332 A | 1/1965 | Olson | |
| 3,231,289 A | 1/1966 | Carrell | |
| 3,757,986 A * | 9/1973 | Eichinger | B65D 39/08 220/304 |

(Continued)

FOREIGN PATENT DOCUMENTS

| | | |
|---|---|---|
| DE | 10 2005 002 913 | 8/2006 |
| DE | 10 2008 032 572 | 2/2010 |

*Primary Examiner* — Nathan Cumar
(74) *Attorney, Agent, or Firm* — Renner, Otto, Boisselle & Sklar, LLP

(57) ABSTRACT

A seal includes a first portion and a second portion, wherein the seal is configurable as a continuous seal having an overlapping region in which the first portion and the second portion overlap. The seal has a jigsaw seal configuration at the overlapping portion. The seal includes a transverse surface that extends between the inner surface and the outer surface of the seal, and a first sealing bead located at a junction between the transverse surface and the inner surface and a second sealing bead located at a junction between the transverse surface and the outer surface. The transverse surface may be recessed relative to the first and second sealing beads when the seal is in a non-compressed state. When the seal is in a compressed state, in the overlapping region one of the first or second sealing beads at the first portion and the other of the first or second sealing beads at the second portion seal against each other, and the transverse surface contacts and seals against a surface of a component being sealed.

18 Claims, 8 Drawing Sheets

(56) References Cited

U.S. PATENT DOCUMENTS

| | | | |
|---|---|---|---|
| 4,572,522 A | 2/1986 | Smagatz | |
| 6,352,267 B1 * | 3/2002 | Rode | F16J 15/0887 |
| | | | 277/631 |
| 9,291,266 B2 * | 3/2016 | Yu | F16J 15/062 |
| 9,714,707 B2 | 7/2017 | Hettle | |
| 10,107,398 B2 * | 10/2018 | Tomlinson | F16J 15/024 |
| 2011/0031704 A1 * | 2/2011 | Lehr | F16J 15/061 |
| | | | 277/630 |

* cited by examiner

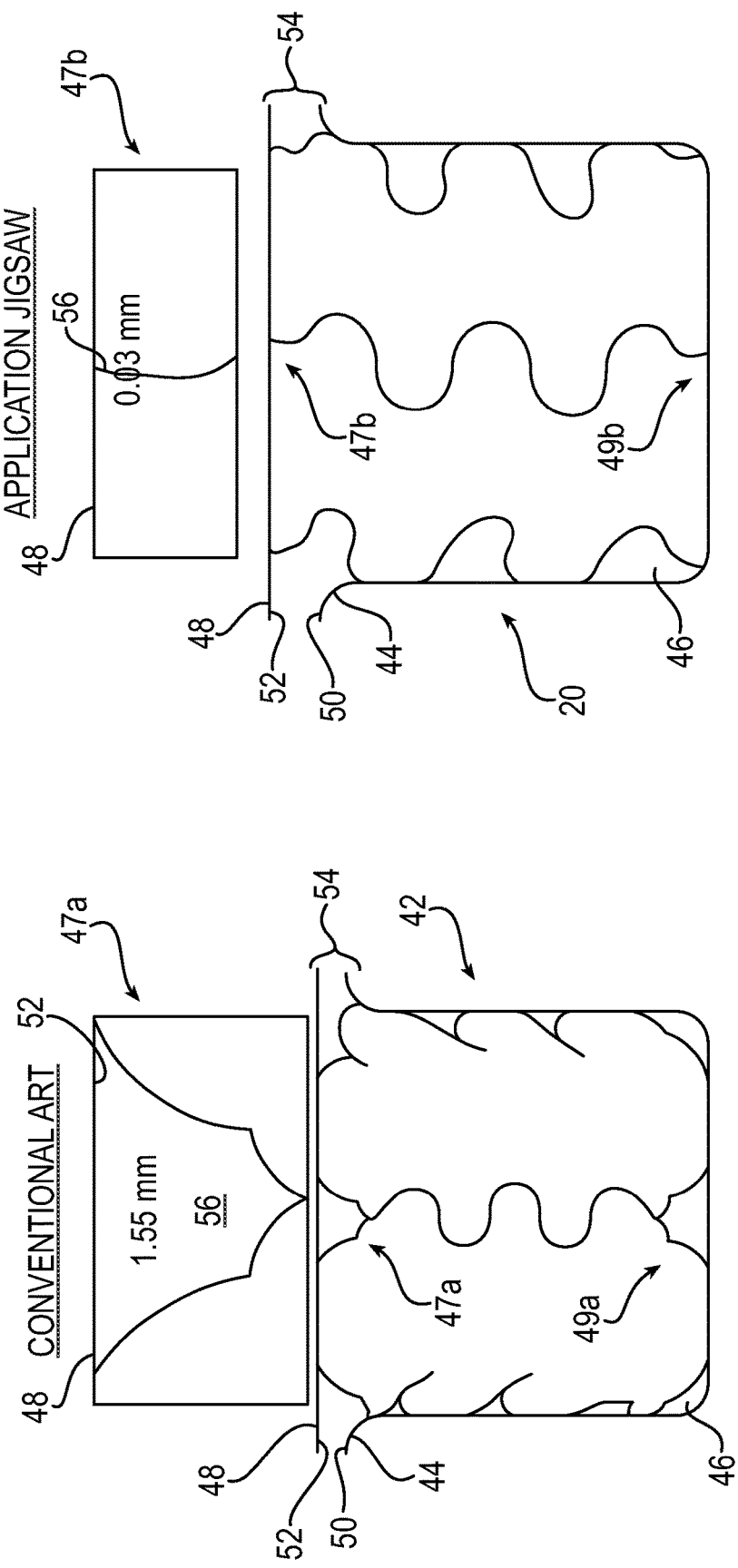

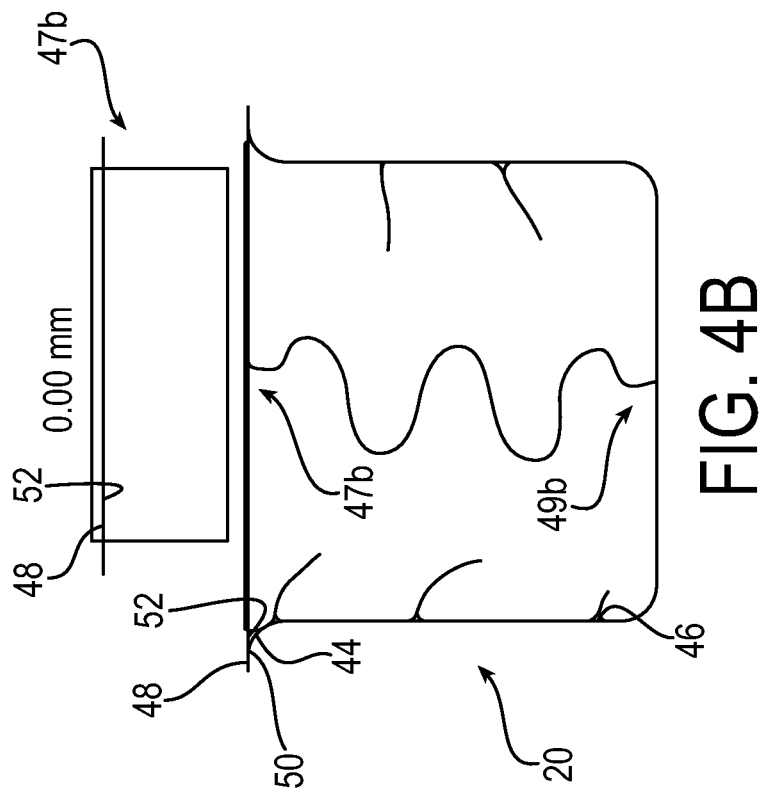
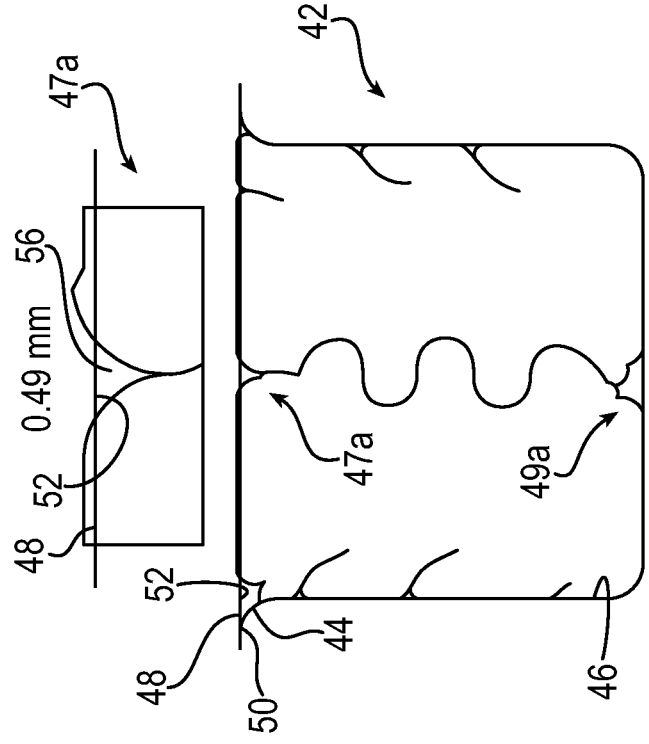

EXTRUDED INTERLOCKING JIGSAW SEAL WITH SEALING BEADS

RELATED APPLICATIONS

This application claims the benefit of U.S. Provisional Application No. 62/837,458 filed Apr. 23, 2019, the content of which is incorporated herein by reference.

FIELD OF INVENTION

The present application relates generally to seal applications that employ a closed loop, continuous sealing configuration of an extruded seal material.

BACKGROUND OF THE INVENTION

In several industries including, for example, automotive and heavy-duty equipment industries, component covers are getting progressively larger for housings for various components such as batteries and other engine components.

These components need sealing. For serviceable sealing, extruded elastomeric solutions are preferred. Due to assembly and service methods, seal retention and seal stability are required for such seals. Previous sealing solutions include molded press-in-place seals that can be expensive.

In many applications, the seal is configured to form a closed loop or continuous seal while in use. The requisite size of the continuous seal can differ in different applications such that a given continuous seal would have limited versatility. Accordingly, the extruded sealing material often is provided as a linear cord stock, which can be cut to any desired size and positioned within a seal retainer as a closed loop continuous seal. A point of leakage or failure, however, is present where the two ends of the linear sealing material meet to form the closed loop continuous seal. In many conventional configurations, extruded sealing material is spliced together at the ends to form the continuous seal. This can be an expensive process and requires each groove length to have a separate seal. Also, installing large spliced seals into grooves can be very difficult and time consuming.

U.S. Pat. No. 10,107,398 (Tomlinson et al., issued Oct. 23, 2018) describes an alternative configuration in which the sealing material is extruded to have a lobed cross-section. To form the closed loop continuous seal, the seal ends overlap such that the lobes interface with opposing pockets, whereby when the seal is compressed an effective seal is maintained where the lobes and pockets interface. Seals using such overlapping ends with interfacing lobes and pockets may be referred to in the art as "jigsaw seals" in that the seal ends overlap comparably as pieces of a jigsaw puzzle.

With a configuration comparable to that described in the '398 patent, however, the shape of the overlapping seal ends is not conducive to effective sealing in the area of the top and bottom of the seal that are adjacent to equipment components being sealed, as significant gaps remain present at the seal top and bottom even upon compression. Prior overlapping jigsaw seal configurations, therefore, have been deficient to provide a continuous seal configuration. To compensate for such deficiencies, a room temperature vulcanizing (RTV) sealant or comparable sealant is applied in the gaps to enhance the continuous seal. The addition of a sealant, however, is undesirable as it adds processing steps and costs to forming the continuous seal. Adding sealant also makes it much more difficult to service the sealed joint, since the overlapping ends are stuck together and sealant has to be applied again when the seal is re-installed.

An alternative solution is to reduce the referenced gaps at the top and bottom of the seal by adding ribs or protrusions to the corresponding portions of the seal retaining groove and component mating surface in the seal overlap area, but adding such structural modifications to the equipment components being sealed is an undesirable complex and expensive manufacturing process.

SUMMARY OF THE INVENTION

There is a need in the art, therefore, for an enhanced jigsaw, continuous loop seal configuration that provides effective sealing without the application of an additional sealant material or structural modification of the seal retaining groove and/or mating surface of the equipment components. In exemplary embodiments, a continuous seal has interlocking lobes that are received in and interface with opposing pockets in a jigsaw seal configuration. The seal configuration provides continuous contact in the middle of the seal without overfilling the groove in other locations, and also allows the seal to be wide enough to be tightly retained and stable within the seal retaining groove formed by one of the mating components.

Embodiments of the current application improve over conventional jigsaw seal configurations by using additional sealing beads formed at the top and bottom of the seal material. In the overlapped section, a first bead of a first seal portion and a second bead of an opposing second seal portion mate together during compression to seal against each other and the mating surfaces of the equipment components being sealed and the surface that defines the retaining groove. In exemplary embodiments, recesses between the first and second beads on the top and bottom of the seal may be formed in the sealing material such that when the seal is compressed, the recesses flatten out and contact the top and bottom mating surfaces of the mating components and the sealing groove. The sealing configurations described in the present application create a continuous sealing surface without the need for application of an additional sealant or structural modification to equipment components being sealed.

An aspect of the invention, therefore, is an enhanced seal that is configurable from a non-compressed state to a compressed state, and that does not result in significant gaps between the seal and the equipment components being sealed when the seal is compressed. In exemplary embodiments, the seal includes a first portion and a second portion, wherein the seal is configurable as a continuous seal having an overlapping region in which the first portion and the second portion overlap; an inner surface and an outer surface opposite from the inner surface, wherein the inner surface and the outer surface define an opposing lobe and pocket that interface with each other in the overlapping region to form a jigsaw seal configuration; a transverse surface that extends between the inner surface and the outer surface; and a first sealing bead located at a junction between the transverse surface and the inner surface and a second sealing bead located at a junction between the transverse surface and the outer surface. When the seal is in the compressed state, in the overlapping region one of the first or second sealing beads at the first portion and the other of the first or second sealing beads at the second portion seal against each other, and the transverse surface contacts and seals against a surface of a first component being sealed. The first portion and the second portion of the seal that form the overlapping region may be opposing end portions of a single piece seal. In exemplary embodiments, the transverse surface is recessed relative to the first and second sealing beads when the seal is in the non-compressed state, and when the seal is in the compressed state the transverse surface flattens against a surface of a first component being sealed.

The seal further may include a second transverse surface that extends between the inner surface and the outer surface, and is opposite from the first transverse surface; and another first sealing bead located at a junction between the second transverse surface and the inner surface and another second sealing bead located at a junction between the second transverse surface and the outer surface. When the seal is in the compressed state, in the overlapping region one of the another first or second sealing beads at the first portion and the other of the another first or second sealing beads at the second portion seal against each other, and the second transverse surface contacts and seals against a surface of a second component being sealed. The surface of the first component being sealed may be a mating surface, and the surface of the second component being sealed may be a base of a sealing groove defined by the second component. In exemplary embodiments, the second transverse surface is recessed relative to the another first and second sealing beads when the seal is in the non-compressed state, and when the seal is in the compressed state the second transverse surface flattens against a surface of a second component being sealed.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

FIG. 3A and FIG. 3B are drawings comparing compression performance of a conventional jigsaw seal as compared to a jigsaw seal configured in accordance with embodiments of the present application.

FIG. 4A and FIG. 4B are drawings that depict variations of FIGS. 3A and 3B respectively, with the compression state of the seal corresponding essentially to full compression.

DETAILED DESCRIPTION

Figure 1:
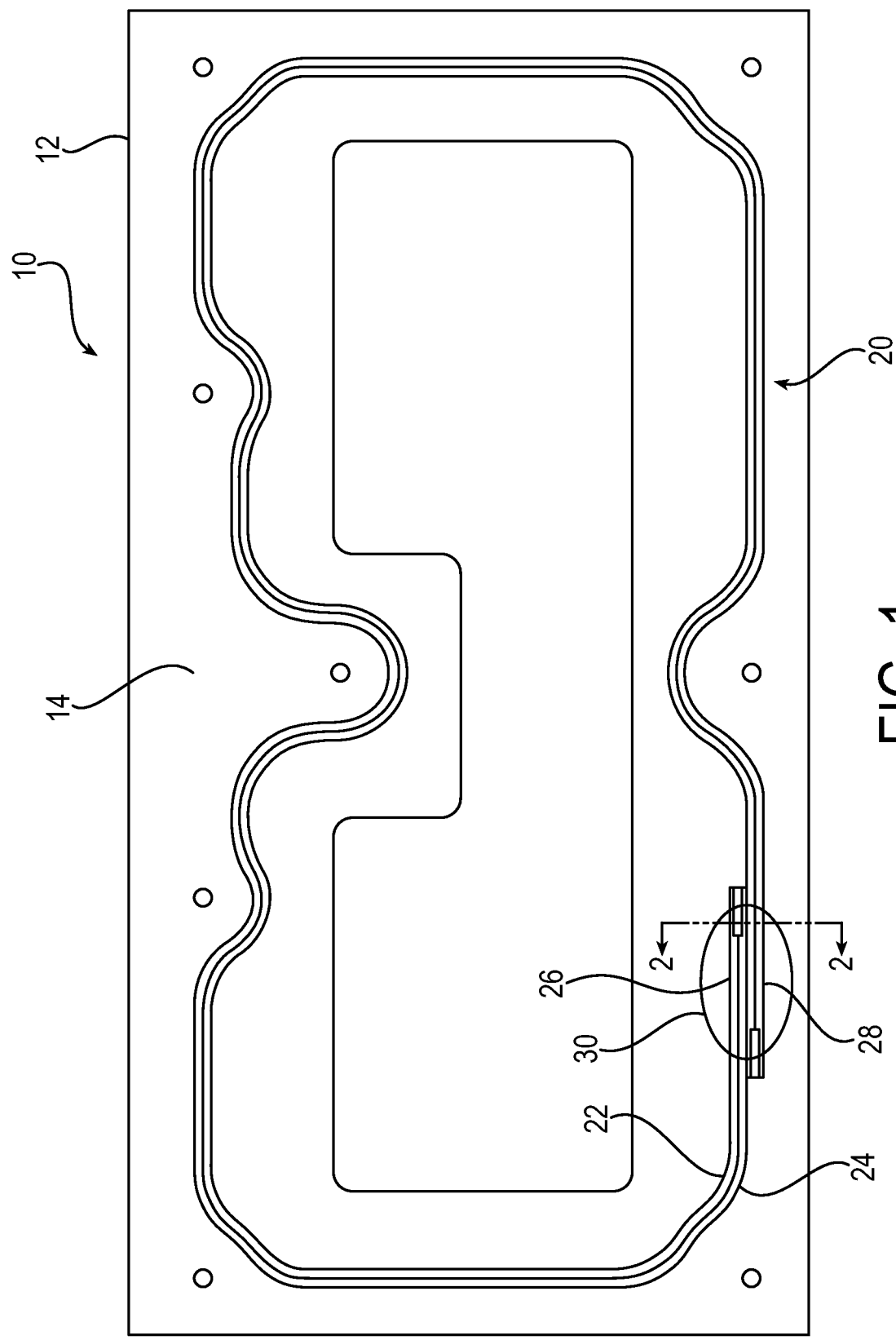
FIG. 1 is a drawing depicting a top view of an exemplary sealed assembly that employs an enhanced continuous seal in accordance with embodiments of the present application.

Embodiments of the present invention will now be described with reference to the drawings, wherein like reference numerals are used to refer to like elements throughout. It will be understood that the figures are not necessarily to scale.

Embodiments of the present application pertain to an enhanced jigsaw, continuous loop seal configuration that provides effective sealing without the application of an additional sealant material or structural modification of the equipment components being sealed. FIG. 1 is a drawing depicting a top view of an exemplary sealed assembly 10 that employs an enhanced continuous seal 20 in accordance with embodiments of the present application. The sealed assembly 10 includes a first mating component 12 that defines a sealing groove that receives the continuous seal 20 (i.e., the sealing groove is not visible in the viewpoint of FIG. 1 because the seal 20 is located within the sealing groove). The first mating component 12 includes a first mating surface 14. In use, the first mating surface is positioned opposite a second mating surface of a second mating component, with the seal 20 being positioned to seal between the opposing mating surfaces of the two mating components and within the sealing groove. The second mating component is not present in the viewpoint of FIG. 1 so that the seal 20 is visible. The mating components may be associated with any suitable application in which a continuous seal is employed, and non-limiting example applications are referenced in the background section above.

As shown in FIG. 1, the continuous seal 20 is formed essentially as a linear cord stock of sealing material that may be cut to any length to fit within the sealing groove defined by the first mating component 12. The seal 20 may be produced via any suitable extrusion process used to form and shape elastomeric materials to ensure uniform conformity of the seal shape. The seal 20 may be made of any resilient compressible elastomer material that is suitable for continuous sealing applications, such as for example an inorganic polymer, an organic polymer, a copolymer, a fluoropolymer, a polyester, a rubber, a silicone rubber, a synthetic rubber, a vinyl polymer, or a terpolymer of ethylene. Accordingly, the sealing groove may be any shape as appropriate for a given application, and the linear cord stock of extruded elastomeric sealing material may be pressed into the sealing groove in accordance with the corresponding groove shape. For example, as shown in FIG. 1, the seal 20 is pressed into a sealing groove of irregular shape with numerous bends and turns, and any suitable shape may be employed.

The seal 20 includes an inner surface 22 and an outer surface 24 opposite from the inner surface 22. The seal 20 further includes a first end portion 26 and a second end portion 28 that overlap at an overlapping region 30, identified by the circle indicator in FIG. 1. To form a continuous seal, in the overlapping region 30 the outer surface 24 of the first end portion 26 interfaces against the inner surface 22 of the second end portion 28. The overlapping configuration alternatively can be the reverse, whereby the inner surface 22 of the first end portion 26 interfaces against the outer surface 24 of the second end portion 28. In this manner, a continuous seal is formed by the overlapping of the seal end portions 26 and 28 in the overlapping region 30.

An aspect of the invention, therefore, is an enhanced seal that is configurable from a non-compressed state to a compressed state, and that does not result in significant gaps between the seal and the equipment components being sealed when the seal is compressed. In exemplary embodiments, the seal includes a first portion and a second portion, wherein the seal is configurable as a continuous seal having an overlapping region in which the first portion and the second portion overlap; an inner surface and an outer surface opposite from the inner surface, wherein the inner surface and the outer surface define an opposing lobe and pocket that interface with each other in the overlapping region to form a jigsaw seal configuration; a transverse surface that extends between the inner surface and the outer surface; and a first sealing bead located at a junction between the transverse surface and the inner surface and a second sealing bead located at a junction between the transverse surface and the outer surface. When the seal is in the compressed state, in the overlapping region one of the first or second sealing beads at the first portion and the other of the first or second sealing beads at the second portion seal against each other, and the transverse surface contacts and seals against a surface of a first component being sealed. The first portion and the second portion of the seal that form the overlapping region may be opposing end portions of a single piece seal. In exemplary embodiments, the transverse surface is recessed relative to the first and second sealing beads when the seal is in the non-compressed state, and when the seal is in the compressed state the transverse surface flattens against a surface of a first component being sealed.

Figure 2:
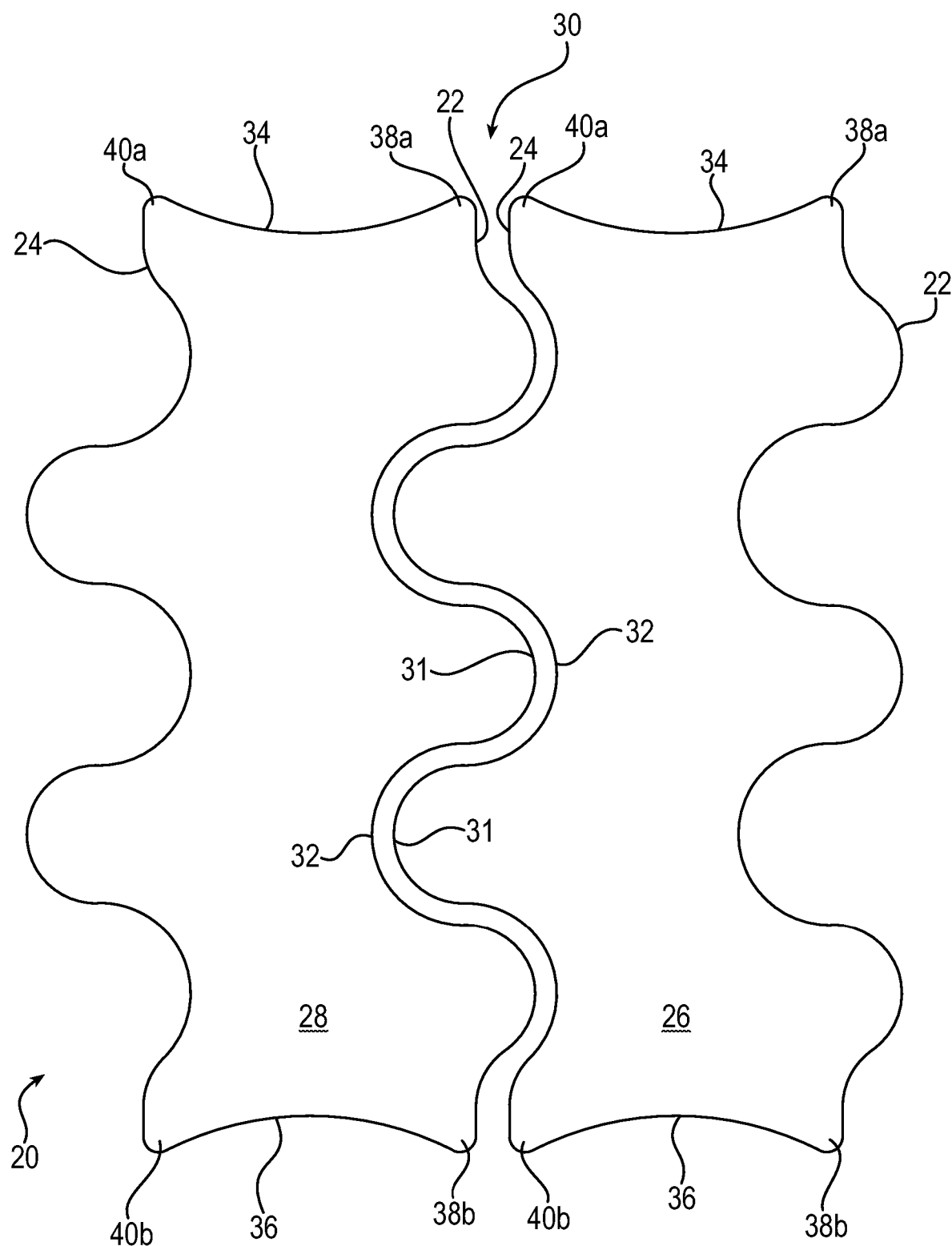
FIG. 2 is a drawing depicting a cross-section view of the overlapping end portions of the seal of FIG. 1 in the area of the overlapping region, the cross-section being taken along the line 2-2 in FIG. 1 in the viewpoint direction of the arrow.

FIG. 2 is a drawing depicting a cross-section view of the overlapping end portions 26 and 28 of the seal 20 of FIG. 1, in the area of the overlapping region 30. The cross-section is taken along the line 2-2 in FIG. 1 in the viewpoint direction of the arrow. As referenced above and again indicated in FIG. 2, in the overlapping region 30 the outer surface 24 of the first end portion 26 interfaces against the inner surface 22 of the second end portion 28. Generally, the continuous seal 20 has at least one lobe that is (are) received in and interfaces with at least one opposing pocket in an interlocking jigsaw seal configuration. Any suitable number of lobes and pockets may be employed, and the pockets may be defined by adjacent lobes (and vice versa). For example, in the embodiment of FIG. 2, the inner surface 22 defines three lobes 31 interspersed with two recesses 32, and the outer surface 24 defines three recesses 32 interspersed with two lobes 31, such that in the overlapping region 30 the lobes 31 are received in and interface with the opposing pockets 32 in an interlocking jigsaw seal configuration. The seal configuration thus provides continuous contact in the middle of the seal 20 within the overlapping region 30, without overfilling the groove in other locations, and also allows the seal to be wide enough to be tightly retained and stable within the seal retaining groove formed by one of the mating components, such as for example the mating component 12 of FIG. 1.

The embodiments of the present application improve over conventional jigsaw seal configurations by using additional sealing beads formed at the top and bottom of the seal material. Referring to FIG. 2, the seal 20 further includes a first transverse surface 34 and an opposing second transverse surface 36, which extend between the inner surface 22 and the outer surface 24. The transverse surfaces 34 and 36 respectively may be referred to as top and bottom surfaces for convenient reference, although it will be appreciated that principles of this application apply regardless of any specific or particular orientation. The first transverse surface 34 extends between an inner sealing bead 38a that is located at a junction between the first transverse surface and the inner surface, and an outer sealing bead 40a that is located at a junction between the first transverse surface and the outer surface. Accordingly, the sealing beads 38a and 40a essentially constitute the rounded corner configuration formed at a junction at which the first transverse surface 34 respectively joins with the inner surface 22 and the outer surface 24. In the exemplary embodiment as depicted in FIG. 2, the first transverse surface 34 is recessed relative to the sealing beads 38a and 40a when the seal is in a non-compressed state.

Similarly, the second transverse surface 36 extends between an inner sealing bead 38b that is located at a junction between the second transverse surface and the inner surface, and an outer sealing bead 40b that is located at a junction between the second transverse surface and the outer surface. Accordingly, the sealing beads 38b and 40b essentially constitute the rounded corner configuration formed at a junction at which the second transverse surface 36 respectively joins with the inner surface 22 and the outer surface 24. In the exemplary embodiment as depicted in FIG. 2, the second transverse surface 36 also is recessed relative to the sealing beads 38b and 40b when the seal is in a non-compressed state.

In the overlapping region 30, because of how the first end portion 26 and the second end portion 28 overlap, a first sealing bead of the first end portion 26 and a second sealing bead of the opposing second end portion 28 mate together during compression to seal against each other and against a surface of one of the equipment components being sealed to form the seal. For example, in the specific overlapping configuration of FIG. 2, adjacent the first transverse surface 34, the inner sealing bead 38a of the second end portion 28 seals against the outer sealing bead 40a of the first end portion 26. Similarly, adjacent the second transverse surface 36, the inner sealing bead 38b of the second end portion 28 seals against the outer sealing bead 40b of the first end portion 26. As referenced above, the overlapping configuration alternatively can be the reverse, whereby the inner surface 24 of the first end portion 26 interfaces against the outer surface 22 of the second end portion 28, which commensurately reverses the sealing bead positions. As further detailed below, during compression the first (e.g., inner) and second (e.g., outer) beads on the first and second transverse surfaces seal against each other. In this embodiment in which the transverse surfaces 34 and 36 are recessed relative to the sealing beads, when compressed the transverse surfaces flatten from the non-compressed recessed configuration. The result of compressing the seal is that the transverse surfaces contact against, and thereby seal against, mating and groove surfaces of the equipment components being sealed with minimal or no gaps, thereby creating a continuous sealing surface.

FIGS. 3A and 3B are drawings comparing compression performance of a conventional jigsaw seal 42 (such as described for example in U.S. Pat. No. 10,107,398 referenced above), as compared to the jigsaw seal 20 configured in accordance with embodiments of the present application. The seals are shown as compressed between a first mating component 44 that defines a sealing groove 46 that receives the given seal, and a second mating component 48 wherein the seal seals a gap between the two mating components. The first mating component 44, therefore, has a first mating surface 50 that defines the sealing groove 46 and interacts against the respective seal 42 or 20, and the second mating component 48 has a second mating surface 52 that interacts against the respective seal 42 or 20 above the sealing groove 46. Each of FIGS. 3A and 3B includes a broad view of the overall compression, and a close-up of the area indicated by arrow 47a (FIG. 3A) and 47b (FIG. 3B), which encompasses a portion of the overlapping region adjacent to the mating surface 52 of the second mating component 48. Similar compression performance occurs at the bottom portion of the overlapping region 49a (FIG. 3A) and 49b (FIG. 3B) at a base of the sealing groove 46.

In the example of FIGS. 3A and 3B, for illustrative purposes a boundary condition is set that may be appropriate for common applications relating to a gap 54 that is present between the first mating component 44 and the second mating component 48. It will be appreciated that the specific numerical example is non-limiting, and comparable performance may be achieved across a range of suitable sealing dimensions. With a compression state that corresponds to the gap 54, a leakage path 56 is measured in the overlapping region adjacent to the mating surface 52 of the mating component 48. The dimensions of the leak path 56 may be defined based on the distance between contact locations of the seal against the mating surface 52, also referred to as the gap width. Again, comparable performance may occur at both the top and bottom of the overlapping region at both the mating surface 52, and at a base of the sealing groove 46 in the region indicated by arrows 49a and 49b.

In the depicted example, in a compression state corresponding to a gap 54 of 0.53 mm, the resultant leak path 56 is 1.55 mm for the conventional seal 42. In contrast, the leak path 56 of the seal 20 of the present application is essentially negligible (being measured at only 0.03 mm). Referring back to FIG. 2 in combination with FIG. 3B, the leak path is substantively eliminated when the seal 20 is compressed because in the overlapping region, the first (e.g., inner) and second (e.g., outer) beads 38a/40a and 38b/40b associated with the first and second transverse surfaces seal against each other, and the transverse surfaces 34 and 36 contact and seal against the mating surface 52 and the base of the sealing groove 46 defined by the equipment components, when the seal is reconfigured from the non-compressed state to the compressed state. In this example in which the transverse surfaces are recessed relative to the sealing beads as shown in FIG. 2, the transverse surfaces flatten to contact and seal against the mating surfaces. Under comparable operating conditions of FIGS. 3A and 3B, the leak path 56 resulting from compression of the seal 20 of the present application remains negligible for gaps 54 up to approximately 0.80 mm.

FIGS. 4A and 4B are drawings that depict variations of FIGS. 3A and 3B respectively, with the compression state correspond essentially to full compression (i.e., the gap 54 essentially is eliminated or zero). Even at full compression, the conventional seal configuration 42 still experiences a significant leak path 56 of 0.49 mm, whereas no measurable leak path is experienced at full compression using the seal configuration 20 of the present application.

Because of the substantial leak paths experienced by conventional jigsaw seal configurations in the area of the top and bottom of the seal, additional compensatory measures must be taken to ensure a continuous seal configuration. As referenced above, typically a room temperature vulcanizing (RTV) sealant or comparable sealant is applied in the gaps to enhance the continuous seal. The addition of a sealant, however, is undesirable as it adds processing steps and costs to forming the seal. Adding sealant also makes it much more difficult to service the sealed joint, since the overlapping ends are stuck together and sealant has to be applied again when the seal is re-installed. An alternative solution is to reduce the referenced gaps at the top and bottom of the seal by adding ribs or protrusions to the corresponding surfaces of the equipment components in the seal overlapping area, but adding such structural modifications to the equipment components is a substantially complex and expensive manufacturing process. The seal configuration of the present application, with the additional sealing beads and surfaces that contact and seal against mating surfaces during compression in the overlapping region of the seal end portions, provides for an enhanced jigsaw, continuous seal configuration that provides effective sealing without the application of an additional sealant material or structural modification of the equipment components.

Figure 5:
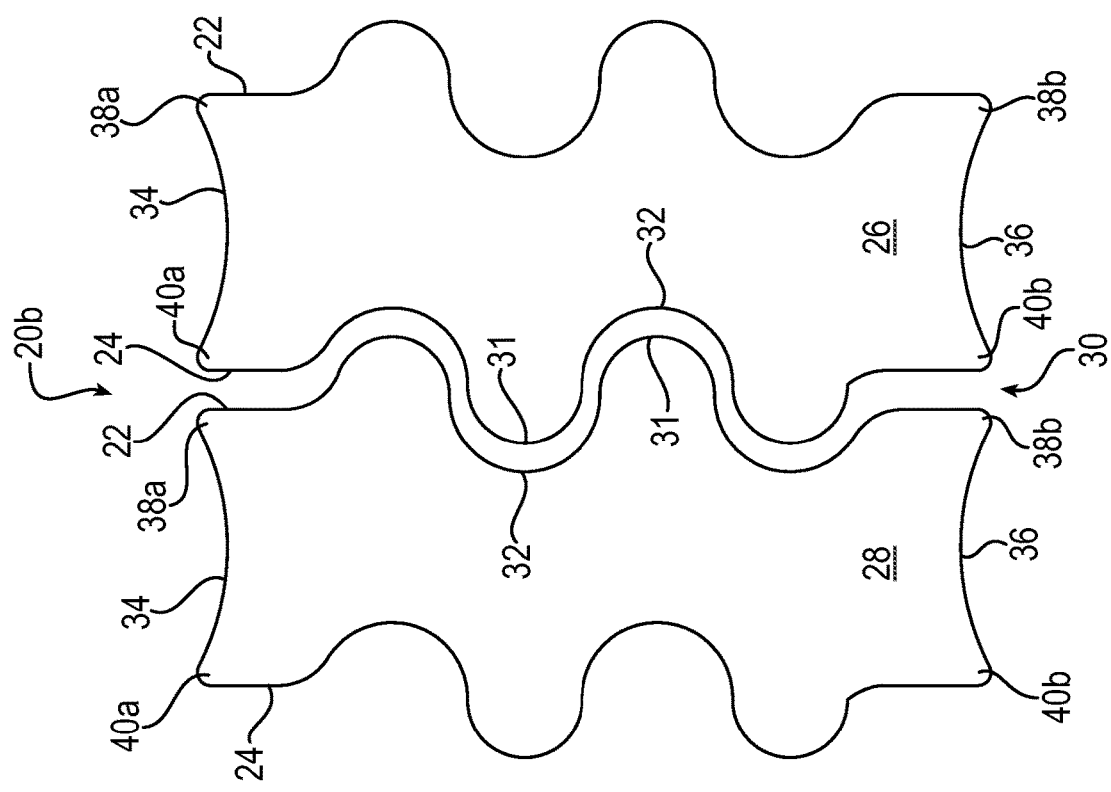
FIG. 5 is a drawing depicting an alternative seal configuration that is a variation on the embodiment of FIG. 2 having a different number of lobes and interfacing pockets.
Figure 6:
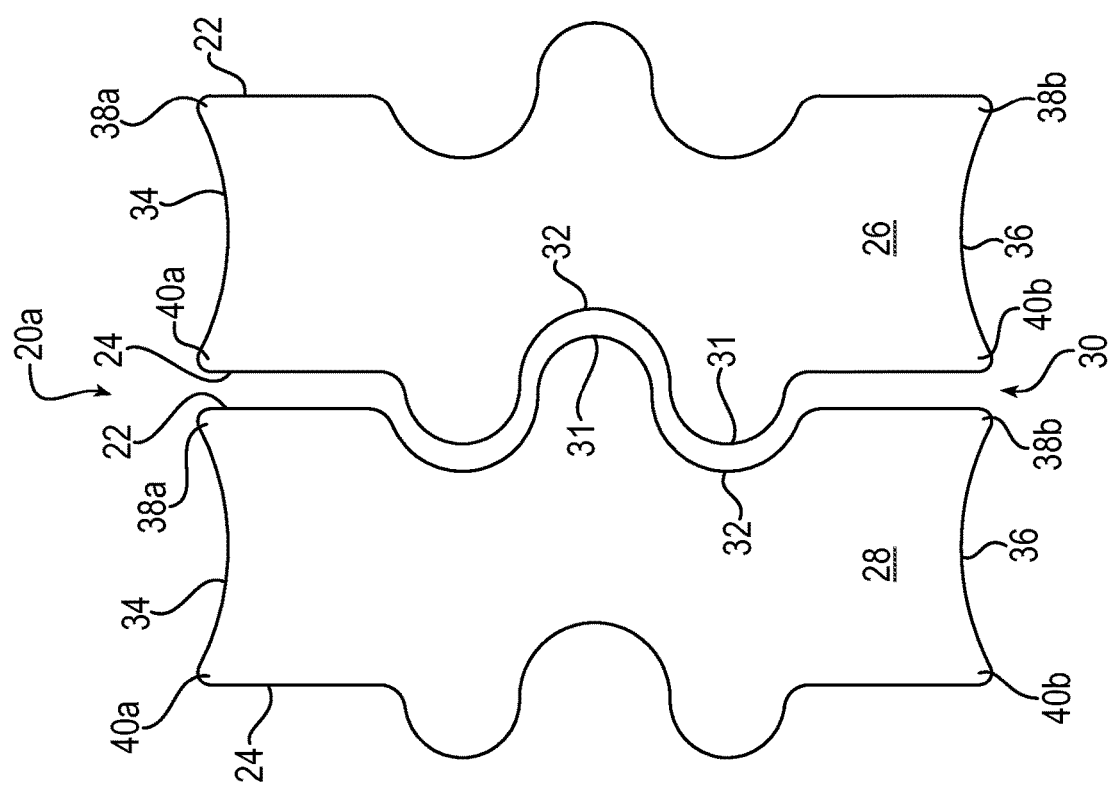
FIG. 6 is a drawing depicting another alternative seal configuration that is a variation on the embodiment of FIG. 2 having a different number of lobes and interfacing pockets.

As referenced above, any suitable number of lobes and pockets may be employed to form the jigsaw seal configuration depending on the application. FIG. 5 and FIG. 6 are drawings that illustrate alternative seal configurations that are variations on the embodiment of FIG. 2, and having a different number of lobes and interfacing pockets. Accordingly, like features are identified in FIGS. 5 and 6 with comparable reference numerals as in FIG. 2.

For example, in the embodiment of FIG. 5 depicting a seal configuration 20a, the inner surface 22 defines one lobe 31 interspersed with two recesses 32, and the outer surface 24 defines one recess 32 interspersed with two lobes 31. In the embodiment of FIG. 6 depicting a seal configuration 20b, the inner surface 22 defines two lobes 31 interspersed with two recesses 32, and the outer surface 24 defines two recesses 32 interspersed with two lobes 31. In each of these variations, similarly as in the embodiment of FIG. 2, in the overlapping region 30 the lobes 31 are received in and interface with the opposing pockets 32 in an interlocking jigsaw seal configuration. Again, any suitable number of lobes and pockets may be employed to form the jigsaw seal configuration as warranted for a given application. In addition, these embodiments also include the first transverse surface 34 that extends between the sealing beads 38a and 40a, and the second transverse surface 36 that extends between the sealing beads 38b and 40b. Accordingly, the embodiments of FIGS. 5 and 6 compress comparably as the seal configuration 20 as shown in FIGS. 3B and 4B, thereby avoiding the leak paths that are present using conventional configurations.

Figure 7:
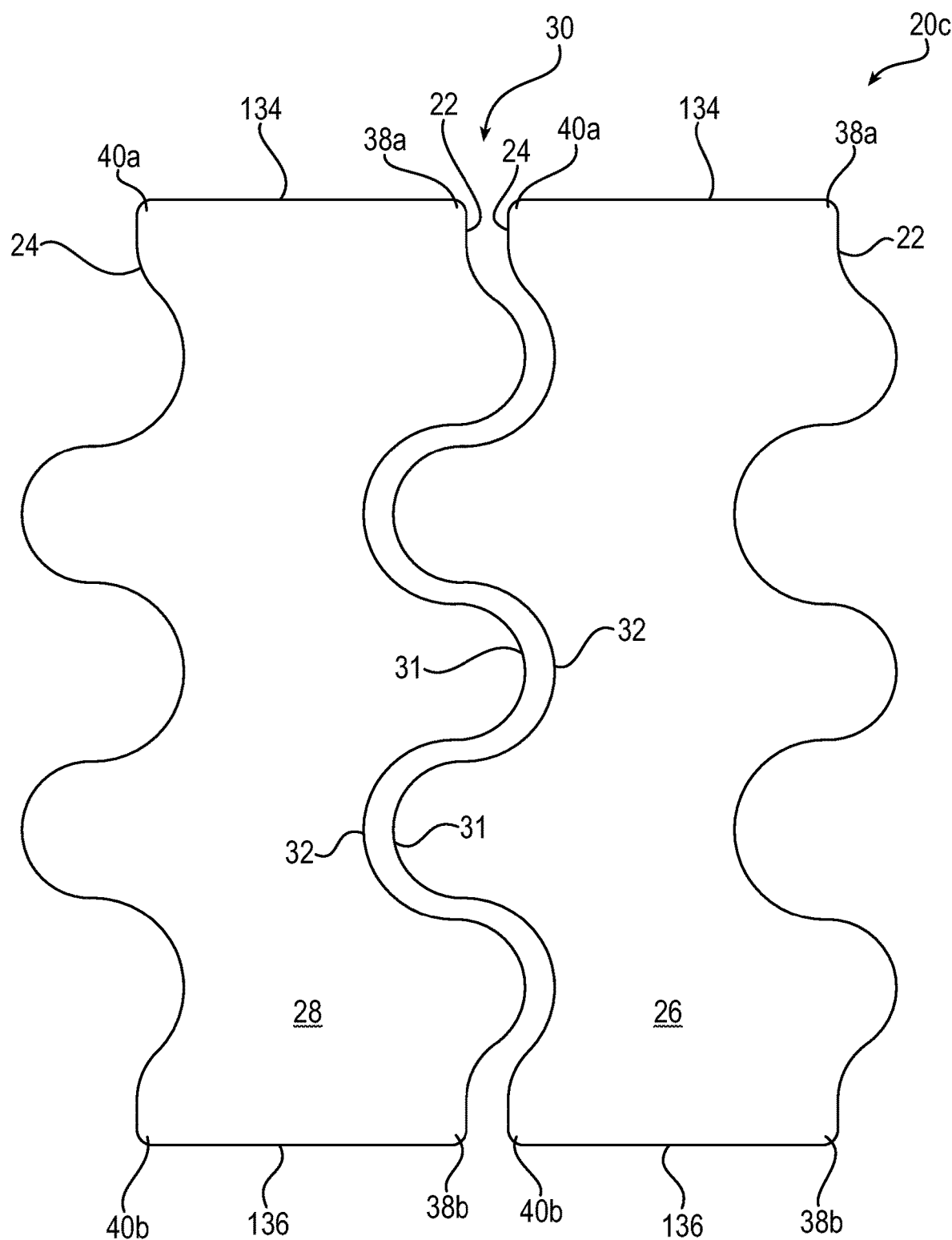
FIG. 7 is a drawing depicting another alternative seal configuration that is a variation on the embodiment of FIG. 2 having straight transverse surfaces that extend perpendicularly between the opposing sealing beads.

FIG. 7 is a drawing depicting another alternative seal configuration 20c that is a variation on the embodiment of FIG. 2, having straight transverse surfaces that extend perpendicularly between the opposing inner and outer surface to form the sealing beads. The seal 20c includes a first transverse surface 134 and an opposing second transverse surface 136, which are straight and extend perpendicularly between the inner surface 22 and the outer surface 24 in the non-compressed state to form the sealing beads. Similarly as in the embodiment of FIG. 2, the first transverse surface 134 extends between the inner sealing bead 38a that is located at a junction between the first transverse surface and the inner surface, and the outer sealing bead 40a that is located at a junction between the first transverse surface and the outer surface. Accordingly, the sealing beads 38a and 40a essentially constitute the rounded corner configuration formed at a junction at which the first transverse surface 134 respectively joins with the inner surface 22 and the outer surface 24. Similarly, the second transverse surface 136 extends between the inner sealing bead 38b that is located at a junction between the second transverse surface and the inner surface, and the outer sealing bead 40b that is located at a junction between the second transverse surface and the outer surface. Accordingly, the sealing beads 38b and 40b essentially constitute the rounded corner configuration formed at a junction at which the second transverse surface 136 respectively joins with the inner surface 22 and the outer surface 24.

The compression achieved in the embodiment of FIG. 7 by reconfiguring the seal 20c from the non-compressed state to the compressed state is comparable as in previous embodiments. In the overlapping region 30, a first sealing bead of the first end portion 26 and a second sealing bead of the opposing second end portion 28 mate together during compression to seal against each other and against a surface of one of the equipment components being sealed to form the seal. For example, in the specific overlapping configuration of FIG. 7, adjacent the first transverse surface 134, the inner sealing bead 38a of the second end portion 28 seals against the outer sealing bead 40a of the first end portion 26. Similarly, adjacent the second transverse surface 136, the inner sealing bead 38b of the second end portion 28 seals against the outer sealing bead 40b of the first end portion 26. As referenced above, the overlapping configuration alternatively can be the reverse. Accordingly, during compression the first (e.g., inner) and second (e.g., outer) beads on the first and second transverse surfaces seal against each other. In addition, with perpendicular transverse surfaces as illustrated in the embodiment of FIG. 7, transverse surfaces 134 and 136 contact and seal against the mating surfaces of the equipment components when the seal is reconfigured from the non-compressed state to the compressed state. The result of compressing the seal is that the transverse surfaces contact against, and thereby seal against, mating and groove surfaces of the equipment components being sealed with minimal or no gaps, thereby creating a continuous sealing surface.

Figure 8:
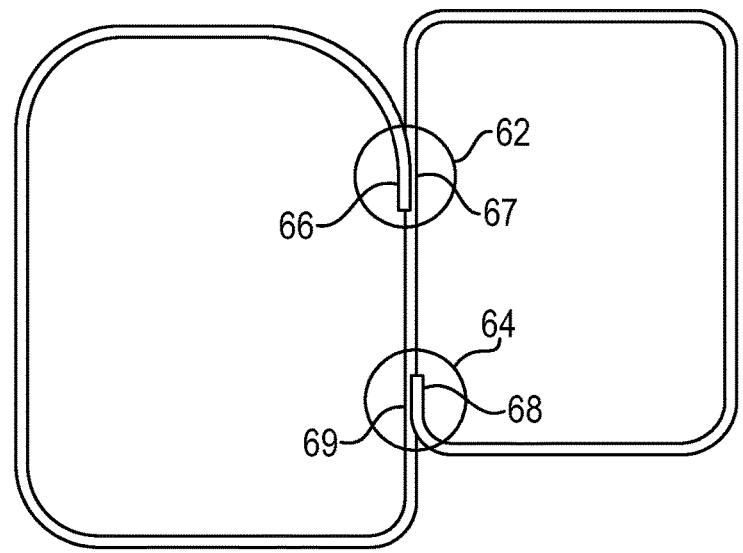
FIG. 8, FIG. 9, and FIG. 10 are drawings depicting alternative seal configurations in which there are multiple overlapping regions.
Figure 9:
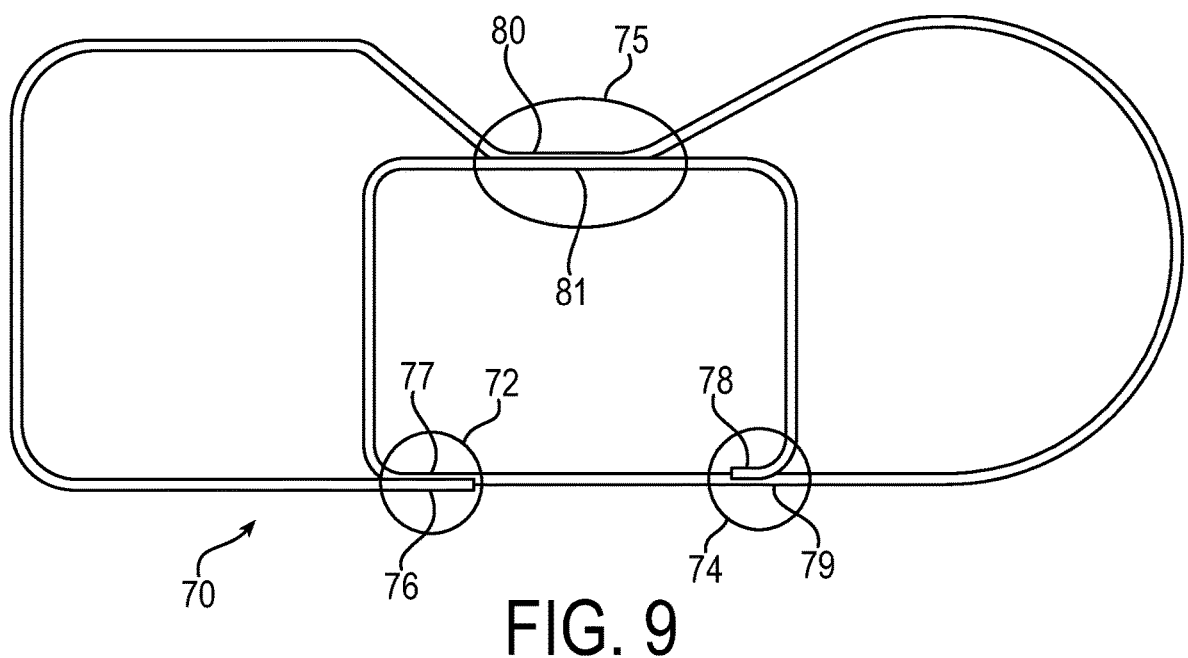

In the embodiments of the previous figures, the first portion and the second portion of the seal that form the overlapping region are opposing end portions of a single piece seal, and there is only one overlapping region formed by such end portions. This need not be the case. For example, FIG. 8 is a drawing depicting a single piece seal 60 that includes a first overlapping region 62 and a second overlapping region 64. The first overlapping region 62 is formed by a first end portion 66 of the single piece seal 60 and a first intermediate portion 67 of the single piece seal 60. The second overlapping region 64 is formed by a second end portion 68 of the single piece seal 60 and a second intermediate portion 69 of the single piece seal 60. As another example, FIG. 9 is a drawing depicting a single piece seal 70 that includes a first overlapping region 72, a second overlapping region 74, and a third overlapping region 75. The first overlapping region 72 is formed by a first end portion 76 of the single piece seal 70 and a first intermediate portion 77 of the single piece seal 70. The second overlapping region 74 is formed by a second end portion 78 of the single piece seal 70 and a second intermediate portion 79 of the single piece seal 70. The third overlapping region 75 is formed by a third intermediate portion 80 of the single piece seal 70 and a fourth intermediate portion 81 of the single piece seal 70. The overlapping seal portions that form the overlapping regions may be configured otherwise as described above. It will be appreciated that any suitable shaped single piece seal may be employed with any number of overlapping regions as warranted for a particular application.

Figure 10:
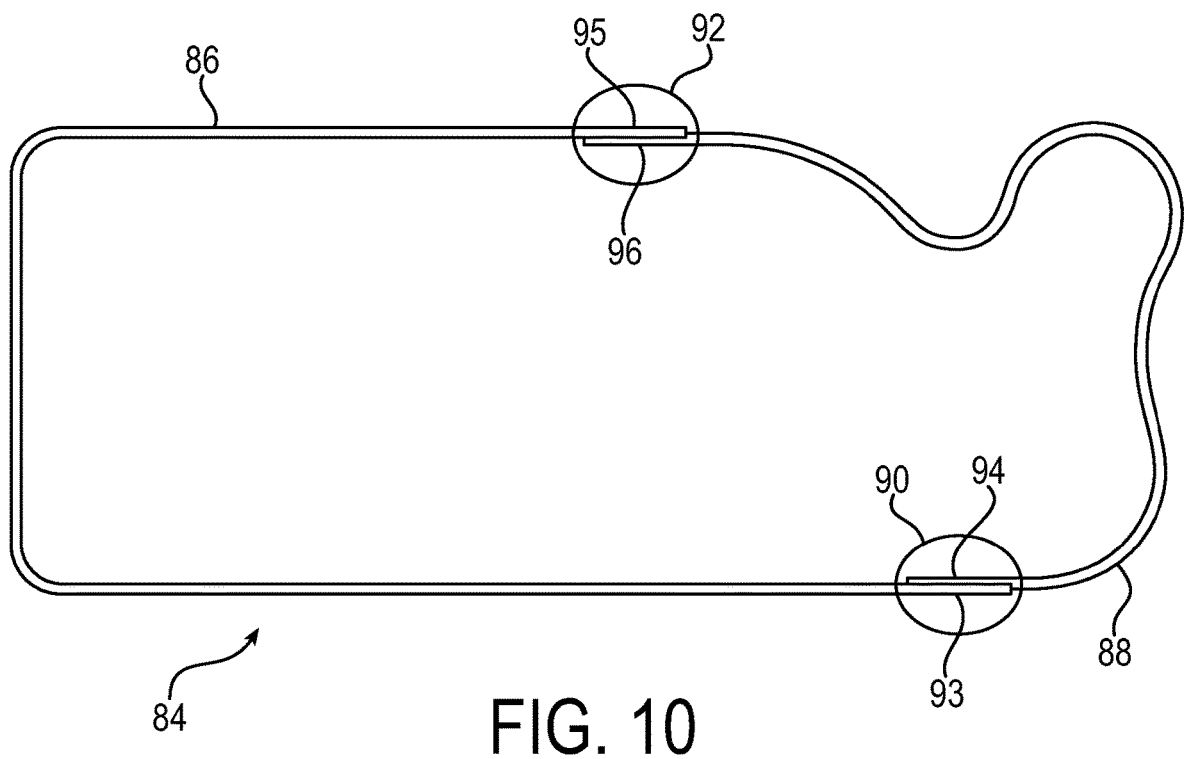

Comparable continuous seal configurations may be employed using multiple seal components with overlapping portions. For example, FIG. 10 is a drawing depicting a seal 84 including a first seal component 86 and a second seal component 88 that are separate components in an uninstalled state. In this example, the seal components are positioned to form a first overlapping region 90 and a second overlapping region 92. Accordingly, in the first overlapping region 90, the first portion of the seal is a portion 93 of the first seal component 86 and the second portion is a portion 94 of the second seal component 88 that form the first overlapping region 90. In the second overlapping region 92, the first portion of the seal is a portion 95 of the first seal component 86 and the second portion is a portion 96 of the second seal component 88 that form the second overlapping region 92. In the depicted example, the first and second portions are end portions of the respective seal components, although this need not be the case (comparably as in FIGS. 8 and 9). In addition, any number of separate seal components may be employed to form any suitable number of overlapping regions. The overlapping seal portions that form the overlapping regions may be configured otherwise as described above.

An aspect of the invention, therefore, is an enhanced seal that is configurable from a non-compressed state to a compressed state, and that does not result in significant gaps between the seal and the equipment components being sealed when the seal is compressed. In exemplary embodiments, the seal includes a first portion and a second portion, wherein the seal is configurable as a continuous seal having an overlapping region in which the first portion and the second portion overlap; an inner surface and an outer surface opposite from the inner surface, wherein the inner surface and the outer surface define an opposing lobe and pocket that interface with each other in the overlapping region to form a jigsaw seal configuration; a transverse surface that extends between the inner surface and the outer surface; and a first sealing bead located at a junction between the transverse surface and the inner surface and a second sealing bead located at a junction between the transverse surface and the outer surface. When the seal is in the compressed state, in the overlapping region one of the first or second sealing beads at the first portion and the other of the first or second sealing beads at the second portion seal against each other, and the transverse surface contacts and seals against a surface of a component being sealed. The seal may include one or more of the following features, either individually or in combination.

In an exemplary embodiment of the seal, the transverse surface is recessed relative to the first and second sealing beads when the seal is in the non-compressed state, and when the seal is in the compressed state, the transverse surface flattens against the surface of the component being sealed.

In an exemplary embodiment of the seal, the transverse surface is perpendicular to the to the inner surface and the outer surface when the seal is in the non-compressed state to form the first and second sealing beads.

In an exemplary embodiment of the seal, the seal further includes a second transverse surface that extends between the inner surface and the outer surface, and is opposite from the first transverse surface; and another first sealing bead located at a junction between the second transverse surface and the inner surface and another second sealing bead located at a junction between the second transverse surface and the outer surface. When the seal is in the compressed state, in the overlapping region one of the another first or second sealing beads at the first portion and the other of the another first or second sealing beads at the second portion seal against each other, and the second transverse surface contacts and seals against a surface of a second component being sealed.

In an exemplary embodiment of the seal, the second transverse surface is recessed relative to the another first and second sealing beads when the seal is in the non-compressed state, and when the seal is in the compressed state, the second transverse surface flattens against the surface of the second component being sealed.

In an exemplary embodiment of the seal, the second transverse surface is perpendicular to the inner surface and the outer surface when the seal is in the non-compressed state to form the another first and second sealing beads.

In an exemplary embodiment of the seal, the inner surface and the outer surface define a plurality of opposing lobes and pockets that interface with each other in the overlapping region to form the jigsaw seal configuration.

In an exemplary embodiment of the seal, in the overlapping region the outer surface of the first portion interfaces with the inner surface of the second portion to form the jigsaw seal configuration.

In an exemplary embodiment of the seal, the seal is made of an elastomeric material.

In an exemplary embodiment of the seal, the first portion and the second portion of the seal are opposing end portions of a single piece seal.

In an exemplary embodiment of the seal, the seal includes more than one overlapping region of a single piece seal, with each overlapping region including a first portion and a second portion configured in accordance with any of the embodiments.

In an exemplary embodiment of the seal, the seal includes a first seal component and a second seal component that are separate components in an uninstalled state, and the first portion is a portion of the first seal component and the second portion is a portion of the second seal component that form the overlapping region.

Another aspect of the invention is a sealed assembly including a first component that includes a first mating surface that defines a sealing groove; a second component that defines a second mating surface; and a seal that is received within the sealing groove and seals between the first mating surface and the second mating surface; wherein the seal in configured in accordance with any of the embodiments. In exemplary embodiments, in the compressed state the transverse surface contacts and seals against the second mating surface and the second transverse surface contacts and seals against a base of the sealing groove. In exemplary embodiments, the first and second transverse surfaces are recessed relative to the sealing beads, and in the compressed state the transverse surface flattens against the second mating surface and the second transverse surface flattens against a base of the sealing groove.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A seal that is configurable from a non-compressed state to a compressed state, the seal comprising:
    a first portion and a second portion, wherein the seal is configurable as a continuous seal having an overlapping region in which the first portion and the second portion overlap;
    an inner surface and an outer surface opposite from the inner surface, wherein the inner surface and the outer surface define an opposing lobe and pocket that interface with each other in the overlapping region to form a jigsaw seal configuration;
    a transverse surface that extends between the inner surface and the outer surface; and
    a first sealing bead located at a junction between the transverse surface and the inner surface and a second sealing bead located at a junction between the transverse surface and the outer surface;
    wherein when the seal is in the compressed state, in the overlapping region one of the first or second sealing beads at the first portion and the other of the first or second sealing beads at the second portion seal against each other, and the transverse surface contacts and seals against a surface of a component being sealed; and
    wherein the transverse surface is recessed relative to the first and second sealing beads when the seal is in the non-compressed state, and when the seal is in the compressed state, the transverse surface flattens against the surface of the component being sealed.

2. The seal of claim 1, wherein the transverse surface is perpendicular to the inner surface and the outer surface when the seal is in the non-compressed state to form the first and second sealing beads.

3. The seal of claim 1, further comprising:
    a second transverse surface that extends between the inner surface and the outer surface, and is opposite from the first transverse surface; and
    another first sealing bead located at a junction between the second transverse surface and the inner surface and another second sealing bead located at a junction between the second transverse surface and the outer surface;
    wherein when the seal is in the compressed state, in the overlapping region one of the another first or second sealing beads at the first portion and the other of the another first or second sealing beads at the second portion seal against each other, and the second transverse surface contacts and seals against a surface of a second component being sealed.

4. The seal of claim 3, wherein the second transverse surface is recessed relative to the another first and second sealing beads when the seal is in the non-compressed state, and when the seal is in the compressed state, the second transverse surface flattens against the surface of the second component being sealed.

5. The seal of claim 3, wherein the second transverse surface is perpendicular to the inner surface and the outer surface when the seal is in the non-compressed state to form the another first and second sealing beads.

6. The seal of claim 1, wherein the inner surface and the outer surface define a plurality of opposing lobes and pockets that interface with each other in the overlapping region to form the jigsaw seal configuration.

7. The seal of claim 1, wherein in the overlapping region the outer surface of the first portion interfaces with the inner surface of the second portion to form the jigsaw seal configuration.

8. The seal of claim 1, wherein the seal is made of an elastomeric material.

9. The seal of claim 1, wherein the first portion and the second portion of the seal are opposing end portions of a single piece seal.

10. The seal of claim 1, wherein the seal includes more than one overlapping region of a single piece seal, with each overlapping region including a respective first portion and a respective second portion.

11. The seal of claim 1, wherein the seal comprises a first seal component and a second seal component that are separate components in an uninstalled state, and the first portion is a portion of the first seal component and the second portion is a portion of the second seal component that form the overlapping region.

12. A sealed assembly comprising:
a first component that includes a first mating surface that defines a sealing groove;
a second component that defines a second mating surface; and
a seal that is received within the sealing groove and seals between the first mating surface and the second mating surface;
wherein the seal comprises:
a first portion and a second portion, wherein the seal is configurable as a continuous seal within the sealing groove having an overlapping region in which the first portion and the second portion overlap;
an inner surface and an outer surface opposite from the inner surface, wherein the inner surface and the outer surface define an opposing lobe and pocket that interface with each other in the overlapping region to form a jigsaw seal configuration;
a transverse surface that extends between the inner surface and the outer surface; and
a first sealing bead located at a junction between the transverse surface and the inner surface and a second sealing bead located at a junction between the transverse surface and the outer surface;
wherein when the seal is in the compressed state, in the overlapping region one of the first or second sealing beads at the first portion and the other of the first or second sealing beads at the second portion seal against each other, and the transverse surface contacts and seals against a surface of one of the components being sealed; and
wherein the transverse surface is recessed relative to the first and second sealing beads when the seal is in the non-compressed state, and when the seal is in the compressed state, the transverse surface flattens against the surface of the component being sealed.

13. The sealed assembly of claim 12, wherein the transverse surface is perpendicular to the inner surface and the outer surface when the seal is in the non-compressed state to form the first and second sealing beads.

14. The sealed assembly of claim 13, wherein the seal further comprises:
a second transverse surface that extends between the inner surface and the outer surface, and is opposite from the first transverse surface; and
another first sealing bead located at a junction between the second transverse surface and the inner surface and another second sealing bead located at a junction between the second transverse surface and the outer surface;
wherein when the seal is in the compressed state, in the overlapping region one of the another first or second sealing beads at the first portion and the other of the another first or second sealing beads at the second portion seal against each other, and the second transverse surface contacts and seals against another surface of one of the components being sealed.

15. The sealed assembly of claim 14, wherein the second transverse surface is recessed relative to the another first and second sealing beads when the seal is in the non-compressed state, and when the seal is in the compressed state, the second transverse surface flattens against the another surface of one of the components being sealed.

16. The sealed assembly of claim 14, wherein the second transverse surface is perpendicular to the inner surface and the outer surface when the seal is in the non-compressed state to form the another first and second sealing beads.

17. The sealed assembly of claim 14, wherein in the compressed state, the transverse surface contacts and seals against the second mating surface and the second transverse surface contacts and seals against a base of the sealing groove.

18. The sealed assembly of claim 12, wherein the inner surface and the outer surface define a plurality of opposing lobes and pockets that interface with each other in the overlapping region to form the jigsaw seal configuration.

* * * * *